United States Patent Office 3,786,101
Patented Jan. 15, 1974

3,786,101
PURIFICATION OF MERCAPTOALKYL
N-ALKYL SULFIDES
Edward E. Huxley, Borger, Tex., assignor to Phillips
Petroleum Company
No Drawing. Filed Apr. 3, 1972, Ser. No. 240,839
Int. Cl. C07c 149/02
U.S. Cl. 260—609 C         7 Claims

ABSTRACT OF THE DISCLOSURE

Crude mercaptoalkyl n-alkyl sulfides containing nitrogen impurities are purified by contacting wtih a paraffinic hydrocarbon solvent which selectively removes the sulfides. The mercaptoalkyl n-alkyl sulfides have utility as metal tarnish preventive agents.

This invention relates to the production of mercaptoalkyl n-alkyl sulfides. In accordance with another aspect, this invention relates to the purification of mercaptoalkyl n-alkyl sulfides containing nitrogen impurities by contacting with a praffinic hydrocarbon which is a selective solvent for the sulfides. In accordance with a further aspect, the purity of mercaptoalkyl n-alkyl sulfide products produced by the reaction of alkylthioalkanols or thiolalkanols with thiourea and a halogen acid is improved by selectively dissolving the sulfides with a praffinic hydrocarbon solvent so that the undissolved impurities can be separated therefrom.

Various procedures have been suggested for the production of mercaptoalkyl n-alkyl sulfides which materials have utility as metal tarnish inhibitors. Efforts have been directed to developing processes which would not make heavy sulfide by-products or heavy nitrogen impurities. Also, it is desired to produce a product of high purity having no real odor problem. In accordance with the invention, a process has been developed for the purification of mercaptoalkyl n-alkyl sulfides containing nitrogen impurities whereby a product of high purity is obtained having substantially no by-products or nitrogen-containing impurities.

Accordingly, an object of this invention is to provide an improved process for the production of high purity mercapto alkyl n-alkyl sulfides.

A further object of this invention is to provide high purity mercaptoalkyl n-alkyl sulfide products which are useful as tarnish preventive agents.

A further object of this invention is to provide a process for the production of mercaptoalkyl n-alkyl sulfides with substantially no heavy nitrogen impurities.

Other objects and aspects as well as the several advantages of the invention will be apparent to those skilled in the art upon reading the specification and the appended claims.

In accordance with the invention, crude mercaptoalkyl n-alkyl sulfide products containing nitrogen impurities and other contaminants are treated with a paraffinic hydrocarbon solvent which selectively removes the sulfides, leaving rejected impuriteis which can be separated from the crude product, leaving a high purity mercaptoalkyl n-alkyl sulfide.

In accordance with one embodiment of the invention, mercaptoalkyl n-alkyl sulfides are produced in high yield and high purity from alkylthioalkanols or thiolalkanols by reaction with thiourea and a halogen acid followed by neutralization and hydrolysis and a solvent extraction step wherein the paraffinic hydrocarbon is used as a selective solvent to remove the sulfides as a high purity product from the reaction effluent.

In accordance with a further embodiment of the invention, crude 2-mercaptoethyl-n-octadecyl sulfide prepared from the reaction of 2-hydroxyethyl-n-octadecyl sulfide with thiourea and HCl followed by neutralization with NaOH is purified by dissolving the 2-mercaptoethyl-n-octadecyl sulfide in paraffin hydrocarbons such as, for example, n-heptane, and removing the precipitated impurities by filtration. If desired, the recovered 2-mercaptoethyl-n-octadecyl sulfide can be separated from the n-heptane solvent by vacuum flashing and the solvent returned for further use in contacting the reaction effluent to recover high purity products.

In accordance with the invention, crude mercaptoalkyl n-alkyl sulfide products are contacted with a paraffinic hydrocarbon solvent which solvent selectively removes the sulfides, leaving impurities as a precipitate which can be readily removed by filtration.

Paraffinic hydrocarbon solvents that can be employed according to the invention will ordinarily have from 5 to 12 carbon atoms and include both straight and branched chain paraffins, such as, for example, n-pentane, isopentane, n-heptane, isoheptane, n-dodecane, and isododecane.

As indicated above, the instant invention is preferably employed for the purification of crude mercaptoalkyl n-alkyl sulfides produced from alkylthiolkanols or thiolalkanols by reaction with thiourea and a halogen acid, such as hydrochloric acid, followed by neutralization and hydrolysis.

The alkylthioalkanols are represented by the formula RSR'OH wherein R is an alkyl group having from 2 to 50, inclusive, carbon atoms and R' is an alkylene group having from 1 to 10, inclusive, carbon atoms, preferably 2 to 5, inclusive, carbon atoms. The thiolalkanols are represented by the formula $HSC_nH_{2n}OH$ wherein $n$ is 2 to 5.

Representative reactant compounds falling within the scope of the above formulas that can be employed include:

ethylthioethanol,
n-octylthioethanol,
tert-dodecylthioethanol,
n-dodecylthioethanol,
n-octadecylthioethanol,
2-mercaptoethanol,
n-eicosyl thioethanol,
n-$C_{22-28}$ alkyl thioethanol, wherein alkyl group has 22 to 28 carbon atoms,
n-$C_{30-50}$ alkyl thioethanol, wherein alkyl group has 30 to 50 carbon atoms,
ethylthiodecanol,
ethylthiopentanol,
n-octadecylthiopentanol,
n-dodecylthiohexanol,
n-octylthiooctanol,
3-mercaptopropanol,
ethylthiomethanol,
pentacontylthiodecanol,
5-mercaptopentanol,
4-mercapto-2-methylbutanol.

The reactions involved in the instant process for conversion of an alkylthioalkanol to a mercaptoalkyl n-alkyl sulfide are illustrated in two steps as follows:

(1) $$RSCH_2CH_2OH + HCl + NH_2\overset{S}{\overset{\|}{C}}NH_2 \longrightarrow RSCH_2CH_2S-C\overset{NH}{\underset{NH_2}{\diagdown}} \cdot HCl + H_2O$$

(2) $$RSCH_2CH_2SC\overset{NH}{\underset{NH_2}{\diagdown}} \cdot HCl + NaOH \longrightarrow RSCH_2CH_2SH + N\equiv CNH_2 + NaCl + H_2O$$

The mercaptoalkyl n-alkyl sulfide products can be represented by the formula RSR'SH wherein R and R' are as defined above with respect to the alkylthioalkanols and thiolalkanols.

The following tabulation illustrates specific mercaptoalkyl n-alkyl sulfides produced from specific sulfide alcohols:

| Sulfide mercaptan | From sulfide alcohol |
|---|---|
| Ethylthioethyl mercaptan | Ethylthioethanol (ETE). |
| n-Octylthioethyl mercaptan | n-Octylthioethanol. |
| tert-Dodecylthioethyl mercaptan | tert-Dodecylthioethanol. |
| n-Dodecylthioethyl mercaptan | n-Dodecylthioethanol. |
| n-Octadecylthioethyl mercaptan (MEOS) | n-Octadecylthioethanol. |
| n-$C_{22-28}$ Alkylthioethyl mercaptan | n-$C_{22-28}$ Alkylthioethanol. |
| n-$C_{30-50}$ Alkylthioethyl mercaptan | n-$C_{30-50}$ alkylthioethanol. |

As indicated above, it has been discovered that the alkylthioethanols especially can be converted to the corresponding mercaptans almost quantitatively by reacting them with hydrochloric acid and thiourea at reflux conditions followed by neutralization of the reaction mixture with caustic.

The reaction temperature for contacting the sulfide alcohol with thiourea and HCl will ordinarily be in the range of 150–250° F., preferably at reflux conditions of about 200–250° F., depending upon the specific reactant. The reaction time will vary from about 10 minutes to about 10 hours, preferably 30 minutes to 8 hours. The reaction is ordinarily carried out in liquid phase conditions and, therefore, autogeneous pressures can be employed.

Although stoichiometric amounts of thiourea and hydrochloric acid can be employed, it is ordinarily preferred to employ a slight excess of these materials.

The concentration of HCl employed can vary appreciably, but ordinarily longer reaction times are needed to obtain high purity product with the commercial grade acids or acids of lower acid strength. Ordinarily acid strengths in the range of 25 to 38 weight percent are preferred.

The isothiuronium salt formed upon reaction of the alkythioalkanols with urea and HCl is hydrolyzed and neutralized by the addition of caustic. Although any of the alkali metal hydroxides can be employed, sodium hydroxide is preferred because of availability and economics. If desired, potassium hydroxide and the other alkali metal hydroxides can likewise be used. The alkali metal hydroxide will be contacted with the reaction mixture preferably after the reaction mixture has been at least partially dehydrated at a strength sufficient to form the mercaptoalkyl sulfide under conditions such that no heavy by-products are made. The caustic will ordinarily be employed as 20 weight percent, although 15 to 50 weight percent or even pelleted caustic (anhydrous) may be used.

The water formed during the reaction plus water added along with the HCl can be removed from the reaction mixture prior to neutralization by any desired technique. Suitable procedures for removing the desired amount of water include (1) refluxing it out with toluene with the aid of a Dean-Stark type water trap, (2) heating the reaction mixture at atmospheric pressure until the boiling temperature reaches 235–250° F.

In actual operation of the process of the invention, the HCl and thiourea are charged to a reaction zone and heated to near the boiling point, followed by addition of the alkylthioalkanol over a period of time. Formation of the isothiuronium salt is slightly exothermic and some care needs to be exercised to prevent boil-over, particularly when employing the lower boiling alkylthioalkanols. At the end of the initial reaction period, water formed in the reaction plus that added as aqueous HCl is removed. If desired, the reaction mixture following partial dehydration can be cooled followed by addition of caustic such as sodium hydroxide. The resulting mixture which comprises an aqueous phase and an organic phase can be separated. The aqueous phase contains salt and cyanamide which can be discarded.

The organic phase remaining containing the mercaptoalkyl sulfide and impurities is contacted in accordance with the invention with a paraffinic hydrocarbon solvent which selectively dissolves the sulfide, yielding a high purity product. The volume ratio of solvent to mercaptoalkyl sulfide generally will be from about 10:1 to about 1:10. The contacting can be effected in usual equipment utilized for solvent extraction. If desired, a plurality of stages of solvent contacting can be employed depending upon the desired purity of the final product. The solvent can be separated from the absorbed mercaptoalkyl sulfide by heating and can be recycled for reuse for further contacting with the crude mercaptoalkyl sulfide product. Generally, it is preferred to heat the mercaptoalkyl sulfide in the solvent to about 100° F. to aid in dissolving the mercaptoalkyl sulfide. The insoluble impurities can be removed from the reaction product by filtration. The process of the invention can be carried out as a batch, semi-continuous or continuous technique.

The present invention is applicable to the purification of any crude mercaptoalkyl sulfide product having impurities, and especially heavy nitrogen impurities. The invention is particularly applicable to the treatment and purification of mercaptoalkyl sulfide contained as described above by the reaction of alkylthioalkanols or thiolalkanols with thiourea and a halogen acid.

SPECIFIC EXAMPLE

Crude 2-mercaptoethyl-n-octadecyl sulfide prepared from the reaction of 2-hydroxyethyl-n-octadecyl sulfide with thiourea and HCl, followed by neutralization with NaOH, was purified by dissolving the 2-mercaptoethyl-n-octadecyl sulfide in n-heptane. The crude product contained heavy nitrogen compounds which are produced as an impurity in the finished product.

In purifying the crude 2-mercaptoethyl-n-octadecyl sulfide of impurities, 100 grams of the crude plant product analyzing 18.7 percent heavy impurities was dissolved in 500 ml. of n-heptane. The solution was left standing for approximately three days. The undissolved heavies were filtered out. The n-heptane was vacuum flashed out of the 2-mercaptoethyl-n-octadecyl sulfide. The recovered 2-2-mercaptoethyl-n-octadecyl sulfide was analyzed for heavy impurities and was found to contain 6.6 percent heavies. (A reduction of 12.1 percent heavies.)

A portion of the heavies which were insoluble in n-heptane was put into 25 percent sodium hydroxide solution and heated. There was an evolution of ammonia from the solid.

It will be observed from the above run that 2-mercaptoethyl-2-octadecyl sulfide was soluble in n-heptane, but the heavy impurities were not. The normal paraffinic hydrocarbon solvents cause a precipitation of the impurities which can be removed from the dissolved 2-mercaptoethyl-n-octadecyl sulfide by filtration. If desired, the solids can then be washed with a normal paraffin and the normal paraffin flashed out of the purified 2-mercaptoethyl-n-octadecyl sulfide and the end paraffin solvent can be used over again.

I claim:

1. A process for the purification of crude mercaptoalkyl n-alkyl sulfide reaction products containing heavy nitrogen impurities wherein the crude reaction product is obtained by the reaction of alkylthioalkanols or thiolalkanols with thiourea and a halogen acid which comprises (a) contacting the crude product with a paraffinic hydrocarbon which selectively dissolves mercaptoalkyl n-alkyl sulfides, leaving nitrogen impurities as a precipitate, (b) separating the precipitated impurities from the paraffinic hydrocarbon solvent containing dissolved mercaptoalkyl n-alkyl sulfides, and (c) recovering substantially pure mercaptoalkyl n-alkyl sulfide product from the paraffinic hydrocarbon solvent as a product of the process.

2. A process according to claim 1 wherein the precipitated impurities in step (a) are separated by filtration.

3. A process according to claim 1 wherein the crude mercaptoalkyl n-alkyl sulfide product is crude 2-mercaptoethyl-n-octadecyl sulfide prepared from the reaction of 2-hydroxyethyl-n-octadecyl sulfide with thiourea and HCl, followed by neutralization with NaOH.

4. A process according to claim 1 wherein the paraffinic hydrocarbon solvent contains from 5 to 12 carbon atoms and the mercaptoalkyl n-alkyl sulfide crude reaction product is heated to a temperature of about 100° F. to aid in dissolving the mercaptoalkyl n-alkyl sulfide.

5. A process according to claim 1 wherein the precipitated impurities obtained in step (a) are separated by filtration and the filtrate thus obtained is washed with a paraffinic hydrocarbon to remove residual mercaptoalkyl n-alkyl sulfide and paraffinic hydrocarbon solvent is flashed from the purified mercaptoalkyl n-alkyl sulfide product.

6. A process according to claim 1 wherein the paraffinic hydrocarbon solvent contains from 5 to 12 carbon atoms and the volume ratio of solvent to mercaptoalkyl n-alkyl sulfide is in the volume ratio of 10:1 to 1:10, and the crude product is heated to a temperature of about 100° F. to aid in dissolving mercaptoalkyl n-alkyl sulfide with a paraffinic hydrocarbon solvent.

7. A process according to claim 3 wherein the paraffinic hydrocarbon solvent is n-heptane.

References Cited

UNITED STATES PATENTS

| | | | |
|---|---|---|---|
| 2,422,341 | 6/1947 | Crouch | 260—609 C |
| 2,452,040 | 10/1948 | Drennan | 260—609 C |

LEWIS GOTTS, Primary Examiner

D. R. PHILLIPS, Assistant Examiner

U.S. Cl. X.R.

260—609 R